United States Patent
Wada

(10) Patent No.: US 8,294,679 B2
(45) Date of Patent: Oct. 23, 2012

(54) DISPLAY AND OPERATION DEVICE, OPERATION DEVICE, AND PROGRAM

(75) Inventor: Mitsuhiro Wada, Kanagawa (JP)

(73) Assignee: Sony Mobile Communications AB, Lund (SE)

(*) Notice: Subject to any disclaimer, the term of this patent is extended or adjusted under 35 U.S.C. 154(b) by 728 days.

(21) Appl. No.: 12/409,881

(22) Filed: Mar. 24, 2009

(65) Prior Publication Data

US 2009/0267912 A1   Oct. 29, 2009

(30) Foreign Application Priority Data

Apr. 23, 2008  (JP) ................................ 2008-112203

(51) Int. Cl.
*G06F 3/041* (2006.01)
(52) U.S. Cl. .................. 345/173; 345/160; 345/184
(58) Field of Classification Search .................. 715/800, 715/853; 345/810, 160, 173, 184, 566; 361/679.06; 455/566
See application file for complete search history.

(56) References Cited

U.S. PATENT DOCUMENTS

| | | | | |
|---|---|---|---|---|
| 5,345,362 A | * | 9/1994 | Winkler | 361/679.06 |
| 5,406,307 A | * | 4/1995 | Hirayama et al. | 715/800 |
| 5,790,121 A | * | 8/1998 | Sklar et al. | 715/853 |
| 8,083,588 B2 | * | 12/2011 | Pryor | 463/31 |
| 2002/0160817 A1 | * | 10/2002 | Salmimaa et al. | 455/566 |
| 2003/0030634 A1 | * | 2/2003 | Sang'udi et al. | 345/418 |
| 2004/0155907 A1 | * | 8/2004 | Yamaguchi et al. | 345/810 |

FOREIGN PATENT DOCUMENTS

| | | |
|---|---|---|
| CN | 1263616 A | 8/2000 |
| CN | 101087459 A | 12/2007 |
| EP | 1 865 408 A2 | 12/2007 |
| JP | 2008-10281 | 1/2008 |
| JP | 2008-66997 | 3/2008 |
| WO | WO 99/54807 | 10/1999 |

OTHER PUBLICATIONS

George Robertson et al., "Large display user experience", Microsoft research, 2005, pp. 1-11.*
Office Action issued Mar. 7, 2012, in Chinese Patent Application No. 200910134595.9 (with English-language translation).
Office Action issued Jan. 12, 2011, in China Patent Application No. 200910134595.9.
Office Action issued Jun. 2, 2011, in China Patent Application No. 200910134595.9.

* cited by examiner

*Primary Examiner* — Thuy Pardo
(74) *Attorney, Agent, or Firm* — Oblon, Spivak, McClelland, Maier & Neustadt, L.L.P.

(57) ABSTRACT

A display and operation device includes a display unit; a touch panel disposed on a display panel of the display unit; and a control unit for displaying a plurality of icons as an operation screen on the display panel of the display unit, the size of each of the plurality of icons being larger for the icons that are farther from a base point positioned in the vicinity of a periphery of the display panel on the device.

12 Claims, 15 Drawing Sheets

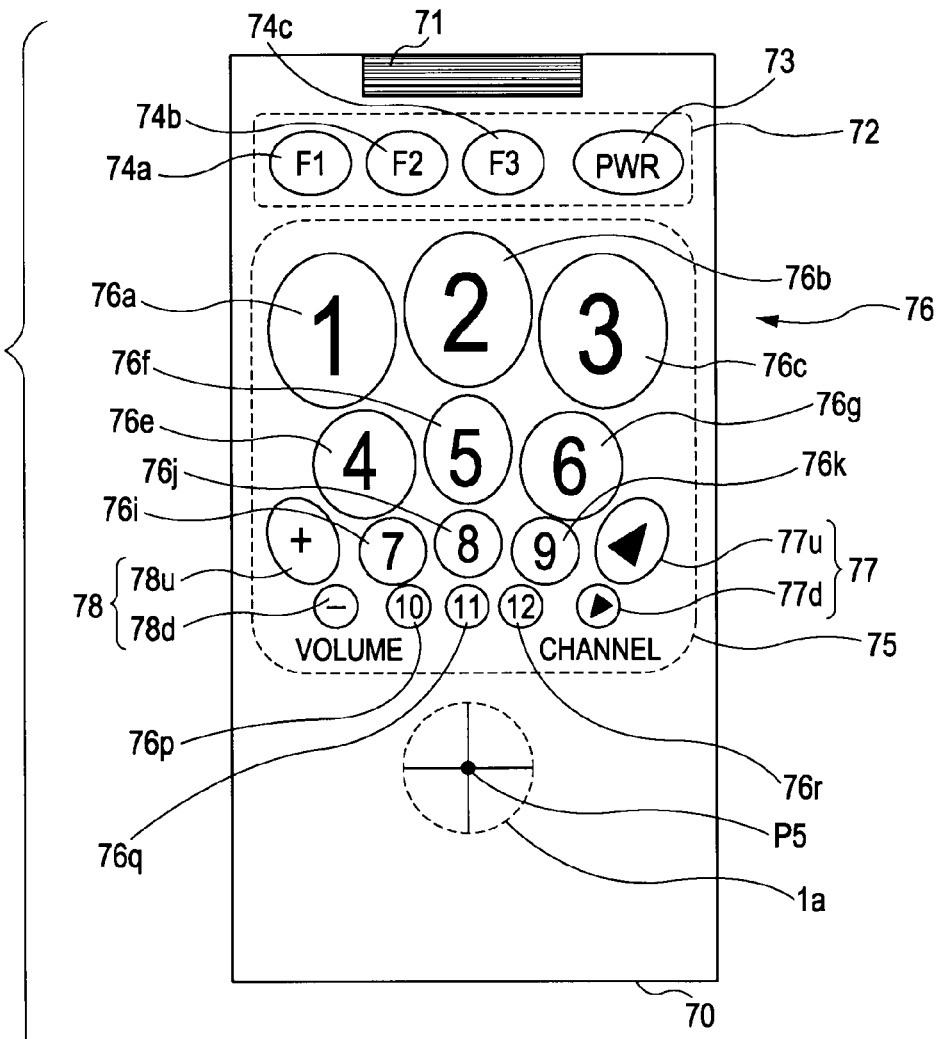
FIG. 13
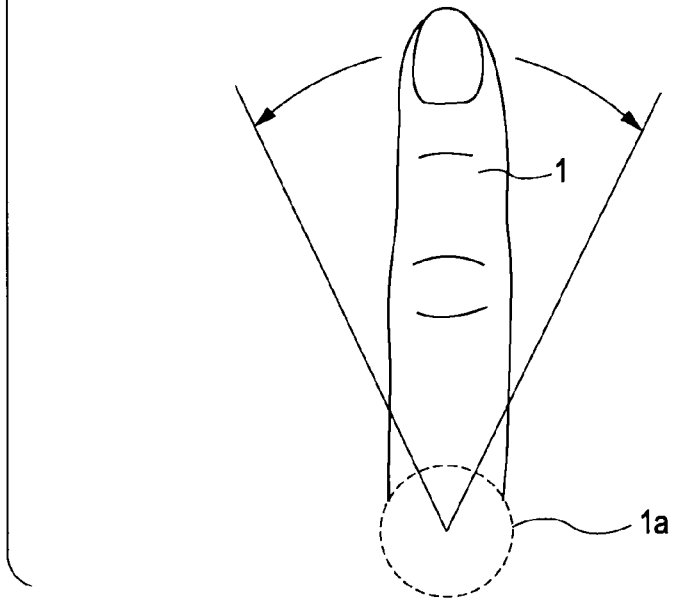

DISPLAY AND OPERATION DEVICE, OPERATION DEVICE, AND PROGRAM

BACKGROUND OF THE INVENTION

1. Field of the Invention

The present invention relates to a display and operation device, such as a mobile phone terminal, that displays an operation screen on a display panel of a display unit, and to an operation device, such as an infrared remote controller, that includes a key operation unit having a plurality of operation keys.

2. Description of the Related Art

In a device with multiple operation keys (buttons), such as a mobile phone terminal or an infrared remote controller for a TV set, all the operation keys or the operation keys of similar types are formed in the same size in rows and columns.

For example, Japanese Unexamined Patent Application Publication No. 2008-10281 describes a straight-type mobile phone terminal including a display unit and a key operation unit on a surface of its housing. In the straight-type mobile phone terminal, numeric keys in the key operation unit are formed in the same size in rows and columns.

Japanese Unexamined Patent Application Publication No. 2008-66997 describes a foldable mobile phone terminal including an upper housing with a display unit that can be opened and closed relative to a lower housing with a key operation unit. In the mobile phone terminal, dial keys in the key operation unit are formed in the same size in rows and columns.

Another type of existing device has a touch panel on the display panel of a display unit, such as a liquid crystal display. This type of device displays an operation screen on the display panel, thereby allowing a user to select a menu item or the like by touching an icon on the operation screen via the touch panel.

The device with the touch panel displays a plurality of icons in the same size in rows and columns on the operation screen as with the device with the operation keys.

SUMMARY OF THE INVENTION

However, with the device including a key operation unit with operation keys formed in the same size in rows and columns, or with the device including a display unit with a display panel on which icons are displayed in the same size in rows and columns as an operation screen, it is not easy to operate the operation keys or the icons, and misoperation may occur.

Referring to FIG. 15, this problem is described. FIG. 15A schematically shows an example of an operation device. An operation device 90 has a key operation unit 91 with twelve operation keys 91a, 91b, 91c, 91e, 91f, 91g, 91i, 91j, 91k, 91p, 91q, and 91r formed in the same size in four rows and three columns.

FIG. 15B shows a state of user's finger along a line connecting the center of the operation key 91b and a point P0 on a housing of the operation device 90.

The user presses a target operation key by holding the right side of the operation device 90 in FIG. 15 with the right hand or the left hand, positioning a base of the finger (index finger) of the right hand or the left hand in the vicinity of the point P0, pivoting the finger side to side (in the direction in which the operation keys 91a, 91b, 91c are arranged) using the base of the finger as a pivot, and stretching and bending the finger back and forth (in the direction in which the operation keys 91b, 91f, 91j, and 91q are arranged).

When the user presses the operation key 91p, 91q, or 91r that is the nearest to the point P0, the user bends the finger and raises a fingertip 1c.

At this time, the fingertip 1c can be precisely moved, and the contact area between the fingertip 1c and the operation key becomes the smallest. Thus, the user can easily and securely press a target operation key without pressing another operation key, whereby misoperation is prevented.

On the other hand, when the user presses the operation key 91a, 91b, or 91c that is the farthest from the point P0, the user stretches the finger and lays the fingertip 1c flat.

At this time, the contact area between the fingertip 1c and the operation key becomes the largest. Thus, the user may press the target operation key together with an adjacent operation key or the user may fail to press the target operation key and only press an adjacent operation key, thereby causing misoperation.

In order to reduce the likelihood of misoperation, the size of operation keys may be increased.

However, this may increase the area of the entire key operation unit and make miniaturization of the device difficult. Moreover, a user has to stretch a finger further so as to press an operation key far from the palm, which impairs ease of operation.

The same problem occurs with a display and operation device that displays an operation screen with icons on a display panel of a display unit.

It is desirable to reduce the likelihood of misoperation and improve ease of operation.

A display and operation device according to an embodiment of the present invention includes a display unit; a touch panel disposed on a display panel of the display unit; and a control unit for displaying a plurality of icons as an operation screen on the display panel of the display unit, the size of each of the plurality of icons being larger for the icons that are farther from a base point positioned in the vicinity of a periphery of the display panel on the device.

An operation device according to an embodiment of the present invention includes a key operation unit disposed in an area of the device, the key operation unit including a plurality of operation keys the size of each of which is larger for the operation keys that are farther from a base point positioned in the vicinity of a periphery of the area of the device.

With the display and operation device having the above-described structure, when a user touches an icon near the base point, the user bends a finger and raises a fingertip, whereby the contact area between the fingertip and the touch panel becomes small. Thus, although the size of icons near the base point is small, the user can easily and assuredly touch a target icon without touching other icons, whereby misoperation is prevented.

On the other hand, when the user touches an icon far from the base point, the user stretches a finger and lays a fingertip flat and the contact area between the fingertip and the touch panel becomes large. However, because the icons far from the base point have a large size, the user can easily and assuredly touch a target icon without touching other icons, whereby misoperation is prevented.

Likewise, with the operation device having the above-described structure, the likelihood of misoperation is reduced and ease of operation is improved.

As heretofore described, according to the embodiments of the invention, the likelihood of misoperation is reduced and ease of operation is improved.

BRIEF DESCRIPTION OF THE DRAWINGS

FIG. 13 is a schematic view showing an example of an infrared remote controller according to an embodiment of an operation device;

DESCRIPTION OF THE PREFERRED EMBODIMENTS

1. First Embodiment (Embodiment as Display and Operation Device)

FIGS. 1 to 12

As a first embodiment, a display and operation device that displays an operation screen on a display panel of a display unit is described. The following embodiment is a mobile phone terminal.

1-1. Structure of Example of Mobile Phone Terminal

Figure 1:
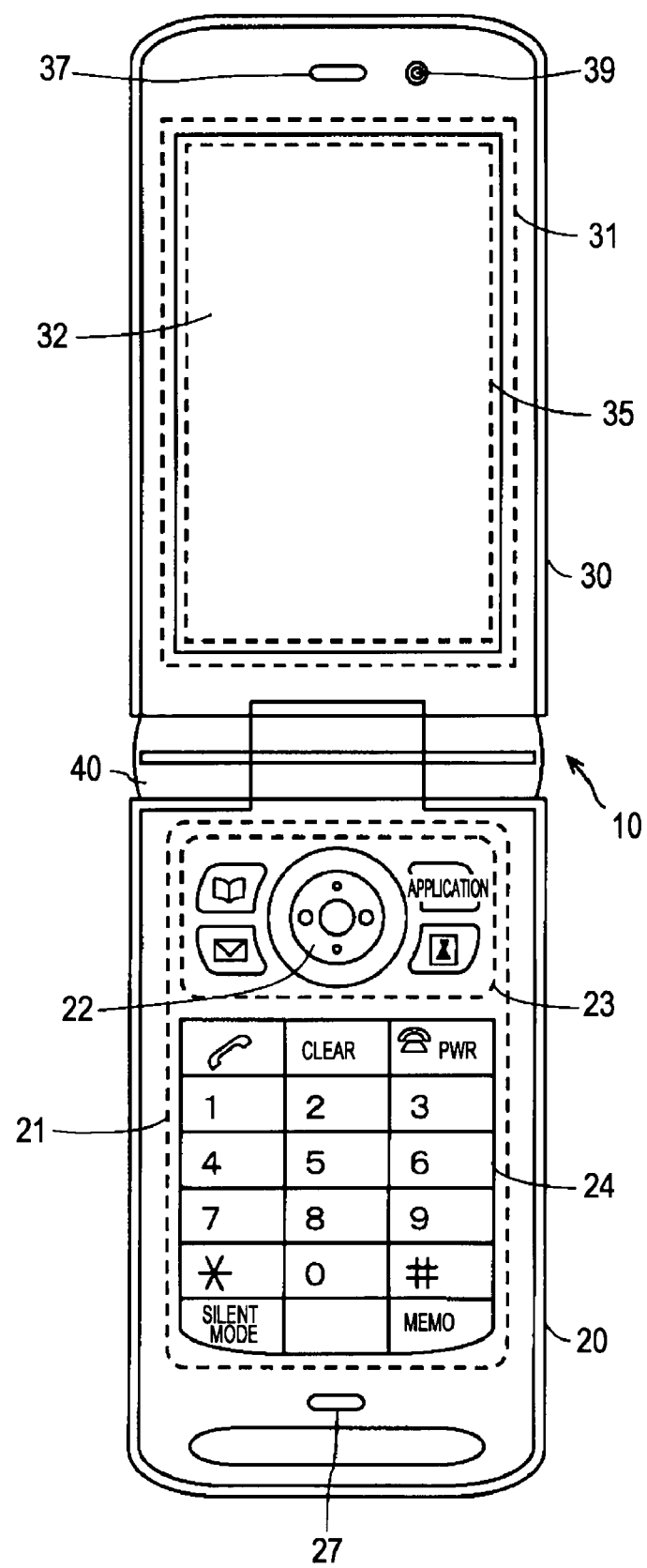
FIG. 1 is a plan view showing an example of a mobile phone terminal according to an embodiment of a display and operation device.
Figure 2:
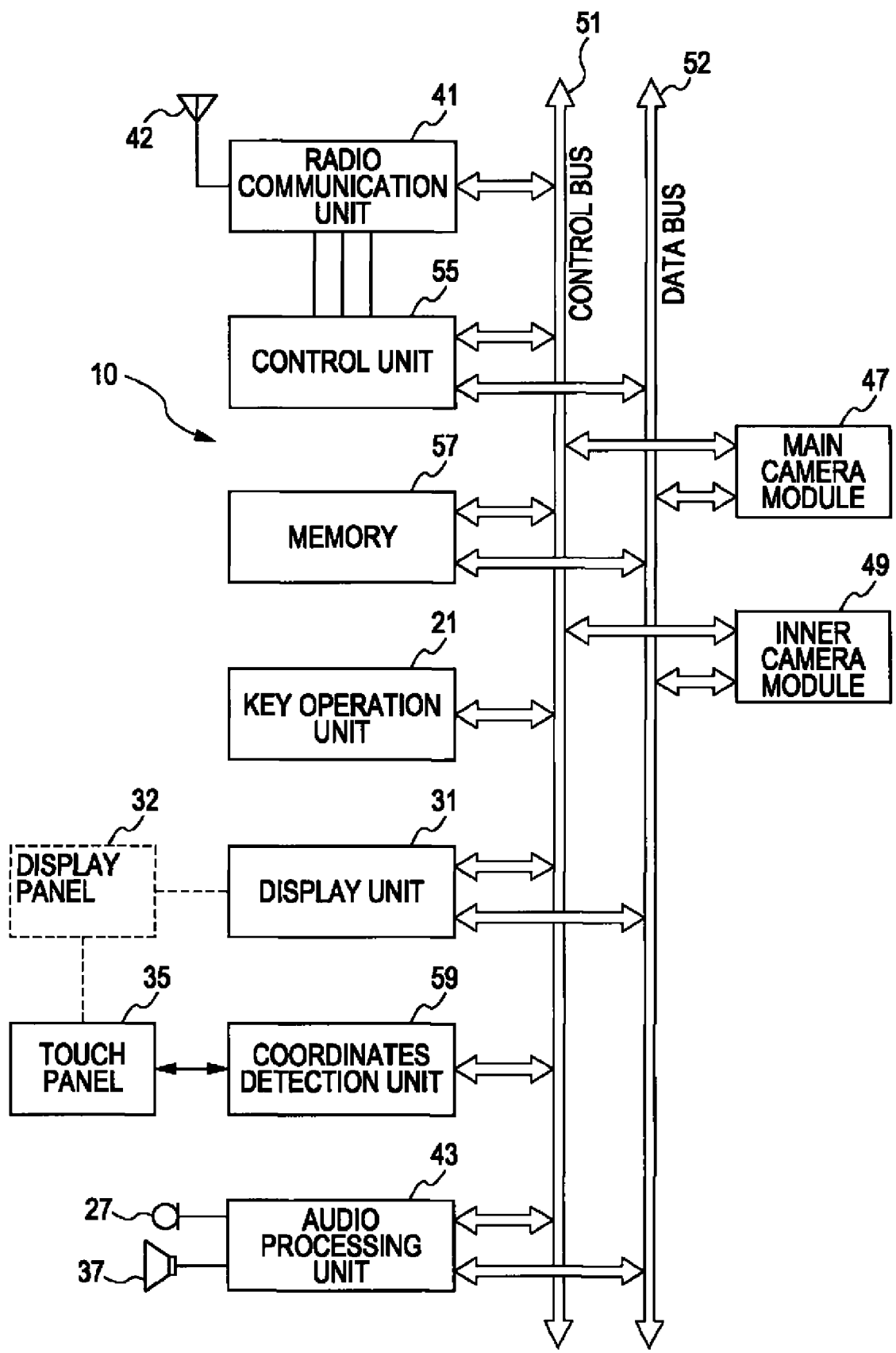
FIG. 2 is block diagram showing a connection structure of the mobile phone terminal in FIG. 1.

FIGS. 1 and 2

<External Structure: FIG. 1>

FIG. 1 shows a mobile phone terminal as a display and operation device according to an embodiment of the invention.

A mobile phone terminal 10 of this embodiment is a foldable mobile phone terminal that includes a lower housing 20, an upper housing 30, and a hinge 40. FIG. 1 shows a state in which the upper housing 30 is open relative to the lower housing 20 with the hinge 40 as a pivot axis.

A key operation unit 21 and a microphone 27 are disposed on the inner surface of the lower housing 20. The key operation unit 21 is constituted by operation keys 23 including a select/enter key 22 and operation keys 24 having numeric keys. A main camera is disposed on the outer (back) surface of the lower housing 20 (not shown in FIG. 1).

On the inner surface of the upper housing 30, a display unit 31 including a display panel 32, a touch panel 35, a speaker 37, and an inner camera 39 are disposed. The display unit 31 includes a liquid crystal display, an organic electroluminescence display, or the like. The touch panel 35 is disposed over substantially the entire area of the display panel 32.

<Connection Structure: FIG. 2>

FIG. 2 shows a connection structure of the mobile phone terminal 10 in FIG. 1.

In the mobile phone terminal 10, a control unit 55, a memory 57, the key operation unit 21, the display unit 31, and a coordinates detection unit 59 are connected to a system bus including a control bus 51 and a data bus 52. The touch panel 35 is connected to the coordinates detection unit 59.

The control unit 55 is implemented in a microcomputer including a CPU. The microcomputer stores a software program for controlling various processing for the mobile phone terminal 10. The CPU in the control unit 55 performs various processing in accordance with the software program.

The memory 57 is, for example, an internal memory including a semiconductor memory such as a flash memory. The memory 57 stores data for images such as moving images and still images, data for screens such as operation screens, data for music and voice, and data for a telephone directory, email, etc.

The coordinates detection unit 59 detects coordinates of the position at which a user touches the touch panel 35 while an operation screen is being displayed on the display panel 32 of the display unit 31. The control unit 55 determines the content of operation, such as a selection by the user, from the detected coordinates.

A radio communication unit 41, an audio processing unit 43, a main camera module 47, and an inner camera module 49 are also connected to the system bus including the control bus 51 and the data bus 52.

The radio communication unit 41 is used for mobile phone communication. An antenna 42 is connected to the radio communication unit 41.

The audio processing unit 43 processes audio signals including voice signals that are transmitted or received. The microphone 27 and the speaker 37 are connected to the audio processing unit 43.

The main camera module 47 includes the main camera, and processes image data captured with the main camera.

The inner camera module 49 includes the inner camera 39, and processes image data captured with the inner camera 39.

1-2. Examples of Operation Screens

Figure 3:
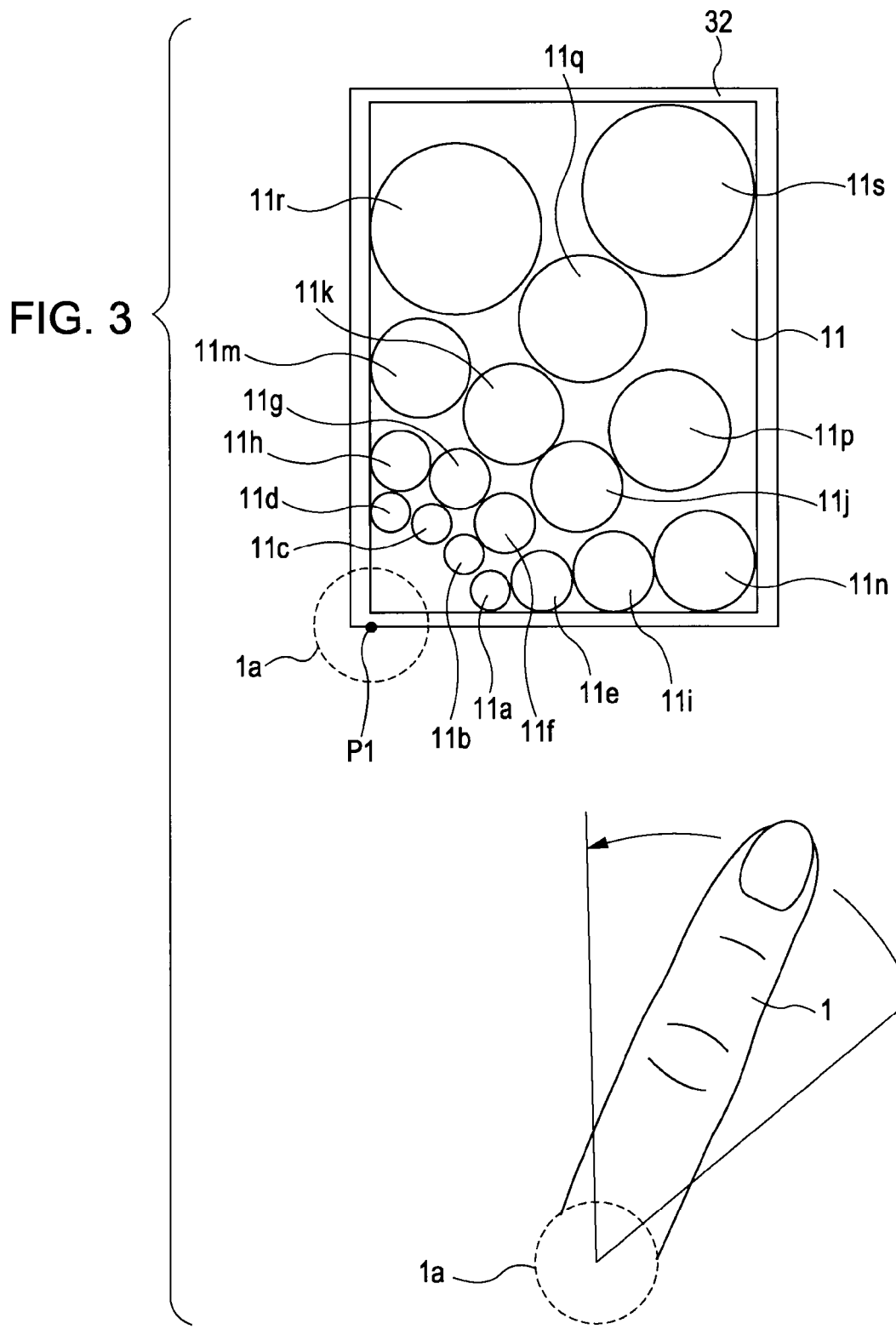
FIG. 3 is a schematic view showing a first example of an operation screen.
Figure 4:
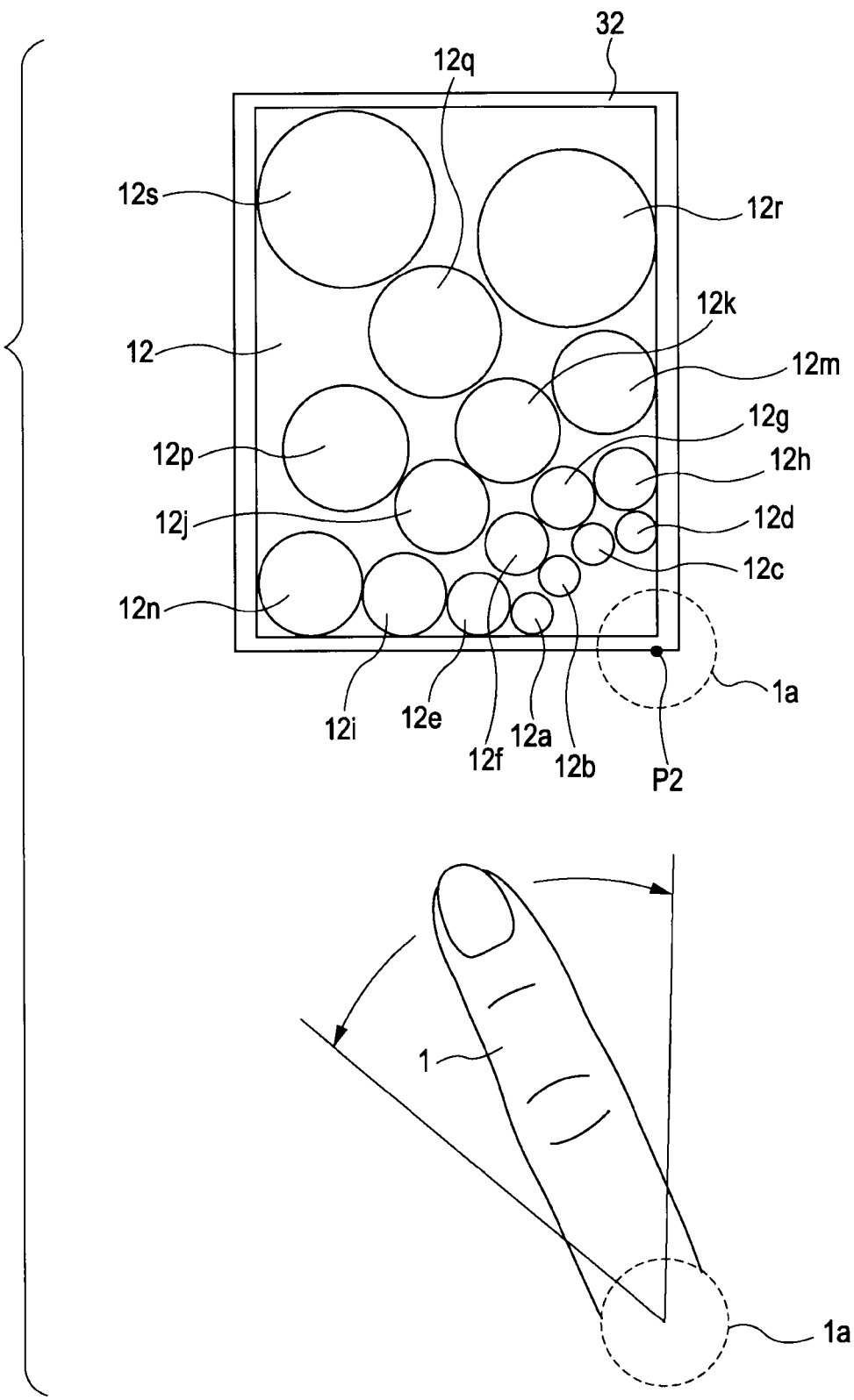
FIG. 4 is a schematic view showing a second example of an operation screen.
Figure 5:
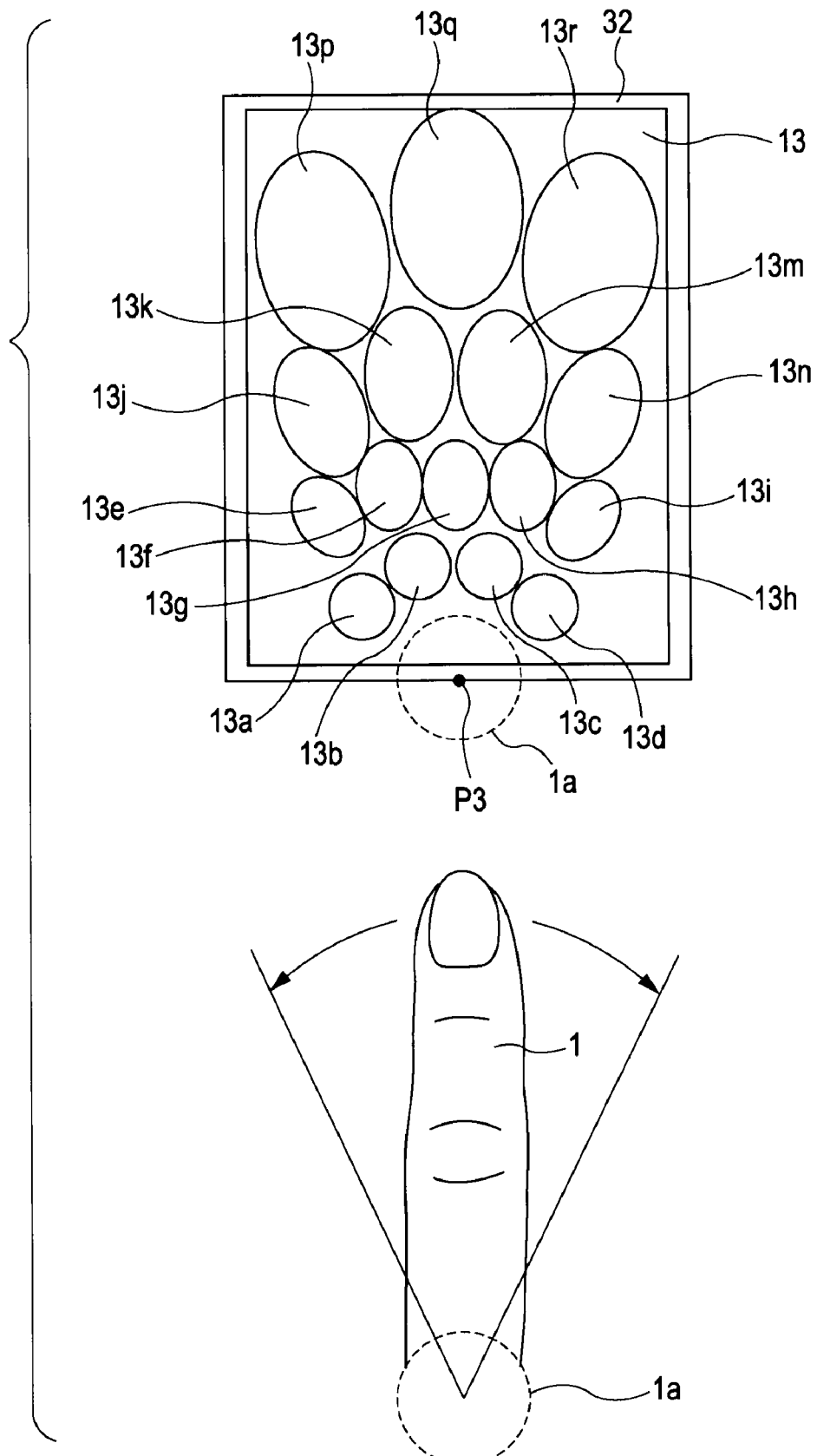
FIG. 5 is a schematic view showing a third example of an operation screen.

FIGS. 3 to 5

The mobile phone terminal 10 in FIGS. 1 and 2 displays an operation screen on the display panel 32 when, for example, a user presses the center of the select/enter key 22 while an initial screen (standby screen) is being displayed on the display panel 32. FIGS. 3, 4, and 5 schematically show examples of the operation screen.

First Example

FIG. 3

An operation screen 11 in FIG. 3 is intended for the case when a user touches the display panel 32 (touch panel) with a finger 1 (index finger) of the right hand while holding the mobile phone terminal with the right hand. In this case, a base 1a of the finger 1 is positioned in the vicinity of the lower-left corner of the display panel 32.

When a base point P1 is set in the vicinity of the lower-left corner of the display panel, icons on the operation screen 11 are configured such that the size of icons increases with increasing distance from the base point P1.

To be specific, the icons 11a, 11b, 11c, and 11d, which are disposed on an arc like a fan, have the smallest size because the distance from the base point P1 is the smallest.

The icons 11e, 11f, 11g, and 11h, which are disposed on an arc like a fan, have a larger size than the icons 11a, 11b, 11c, and 11d because their distance from the base point P1 is larger than the distance of the icons 11a, 11b, 11c, and 11d from the base point P1.

The icons 11i, 11j, 11k, and 11m, which are disposed on an arc like a fan, have a larger size than the icons 11e, 11f, 11g, and 11h because their distance from the base point P1 is larger than the distance of the icons 11e, 11f, 11g, and 11h from the base point P1.

The icons 11n, 11p, 11q, and 11r, which are disposed on an arc like a fan, have larger sizes than the icons 11i, 11j, 11k, and 11m because the distances from their base point P1 are larger than the distance of the icons 11i, 11j, 11k, and 11m from the base point P1. Note that, among the icons 11n, 11p, 11q, and 11r, the distance from the base point P1 and the size are the largest for the icon 11n and the smallest for the icon 11r. The icon 11s has the largest size because the distance from the base point P1 is the largest.

Second Example

FIG. 4

An operation screen 12 in FIG. 4 is intended for the case when a user touches the display panel 32 (touch panel) with a finger 1 (index finger) of the left hand while holding the mobile phone terminal with the left hand. In this case, a base 1a of the finger 1 is positioned in the vicinity of the lower-right corner of the display panel 32.

When a base point P2 is set in the vicinity of the lower-right corner of the display panel, icons on the operation screen 12 are configured such that the size of icons increases with increasing distance from the base point P2.

To be specific, icons 12a, 12b, 12c, 12d, 12e, 12f, 12g, 12h, 12i, 12j, 12k, 12m, 12n, 12p, 12q, 12r, and 12s on the operation screen 12 correspond to the icons 11a, 11b, 11c, 11d, 11e, 11f, 11g, 11h, 11i, 11j, 11k, 11m, 11n, 11p, 11q, 11r, and 11s on the operation screen 11 in FIG. 3.

Third Example

FIG. 5

An operation screen 13 in FIG. 5 is intended for the case when a user touches the display panel 32 (touch panel) with a finger 1 (index finger) of the right or left hand while holding the mobile phone terminal with the right or left hand. In this case, a base 1a of the finger 1 is positioned at the center of the bottom of the display panel 32 in the left-right direction.

When a base point P3 is set at the center of bottom of the display panel 32 in the left-right direction, icons on the operation screen 13 are configured such that the size of icons increases with increasing distance from the base point P3.

To be specific, the icons 13a, 13b, 13c, and 13d, which are disposed on an arc like a fan, have the smallest size because the distance from the base point P3 is the smallest.

The icons 13e, 13f, 13g, 13h, and 13i, which are disposed on an arc like a fan, have a larger size than the icons 13a, 13b, 13c, and 13d because their distance from the base point P3 is larger than the distance of the icons 13a, 13b, 13c, and 13d from the base point P3.

The icons 13j, 13k, 13l, and 13n, which are disposed on an arc like a fan, have a larger size than the icons 13e, 13f, 13g, 13h, and 13i, because their distance from the base point P3 is larger than the distance of the icons 13e, 13f, 13g, 13h, and 13i from the base point P3.

The icons 13p, 13q, and 13r, which are disposed on an arc like a fan, have the largest size because the distance from the base point P3 is the largest.

1-3. Operation on Operation Screen

FIGS. 6 to 10

Figure 6:
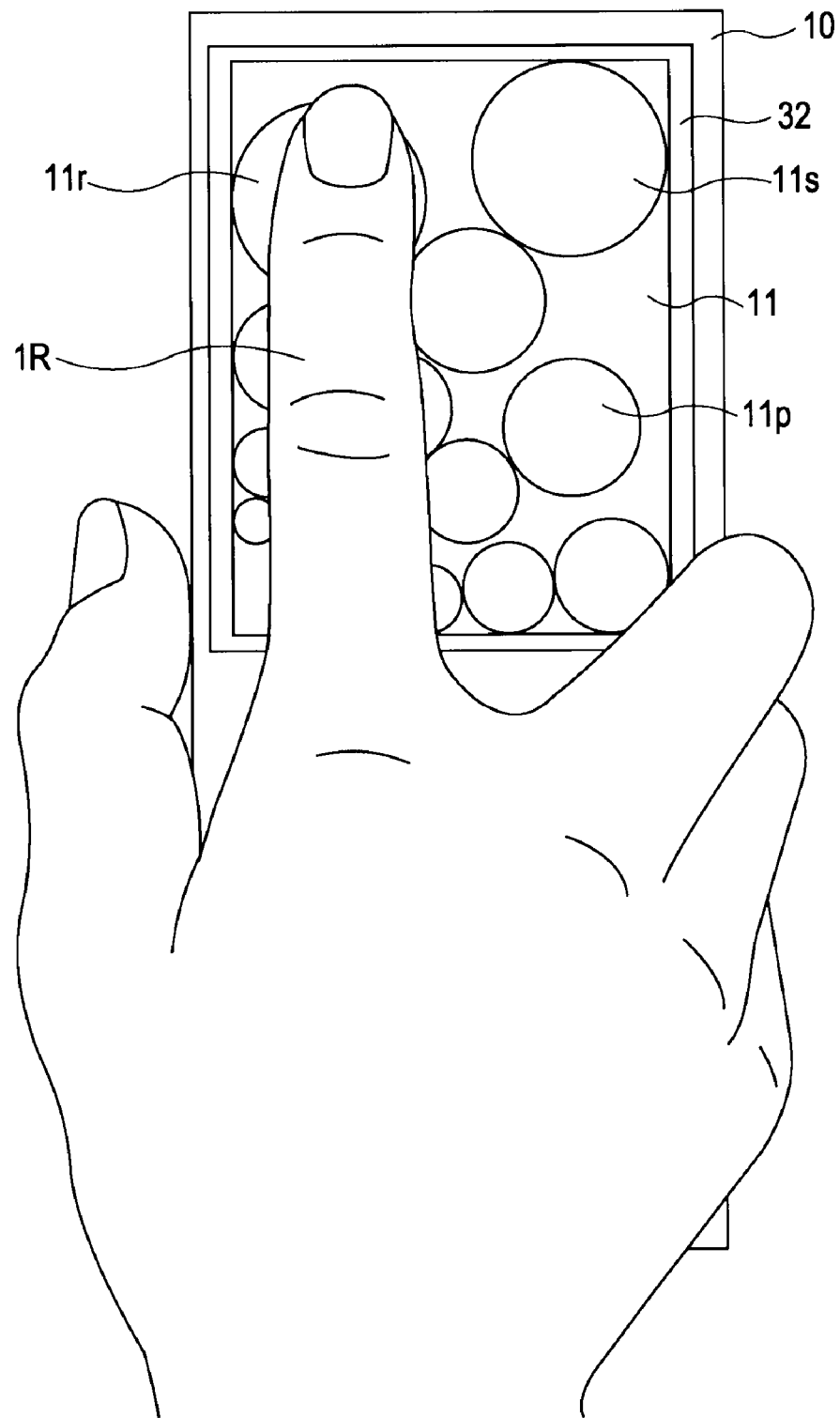
FIG. 6 is a schematic view showing a state in which the operation screen in FIG. 3 is operated.

As shown in FIG. 6, with the operation screen 11 in FIG. 3, a user touches the operation screen 11 (touch panel) with a finger 1R of the right hand while holding the mobile phone terminal 10 with the right hand.

Figure 7:
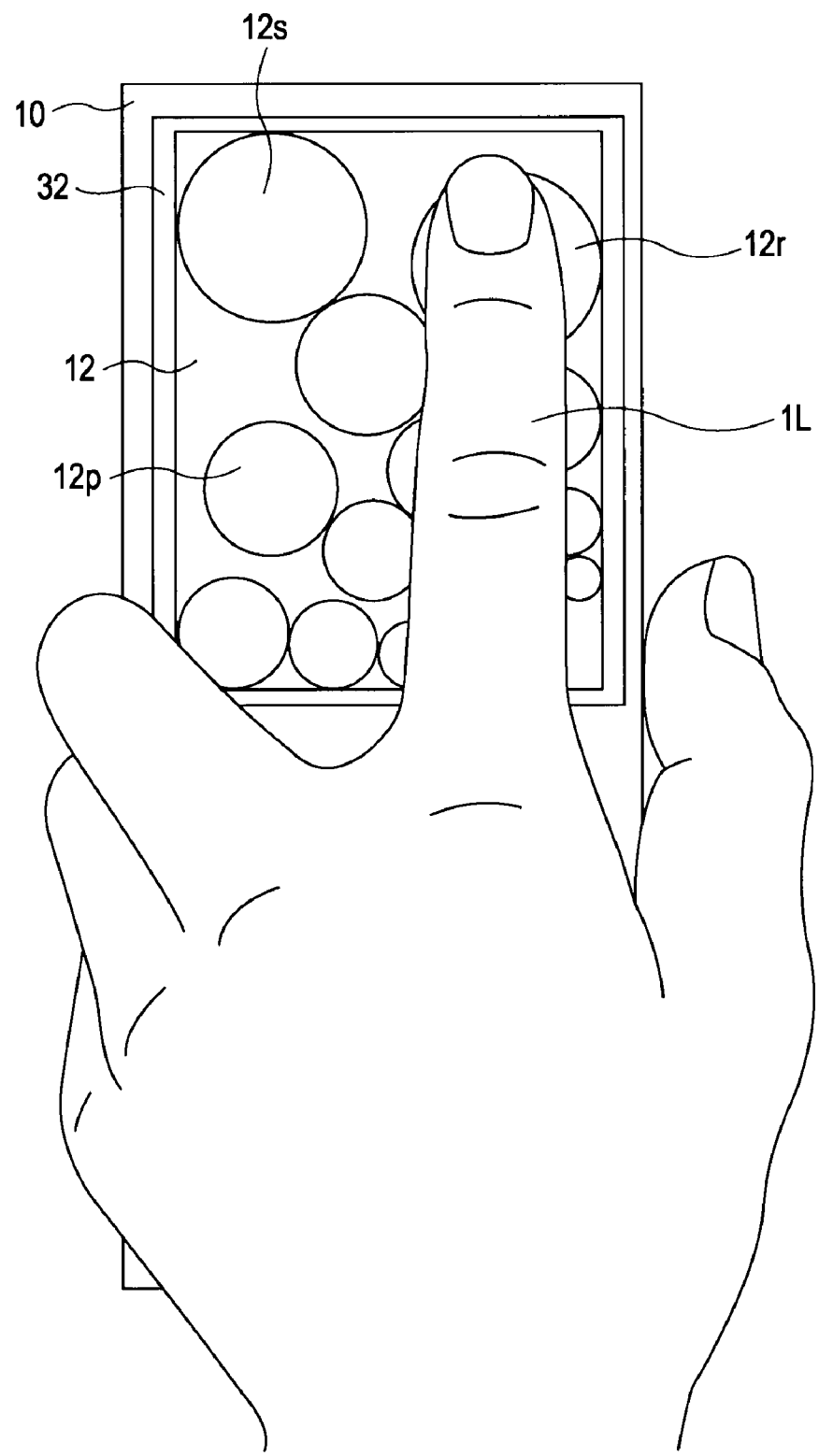
FIG. 7 is a schematic view showing a state in which the operation screen in FIG. 4 is operated.

As shown in FIG. 7, with the operation screen 12 in FIG. 4, a user touches the operation screen 12 (touch panel) with a finger 1L of the left hand while holding the mobile phone terminal 10 with the left hand.

Figure 8:
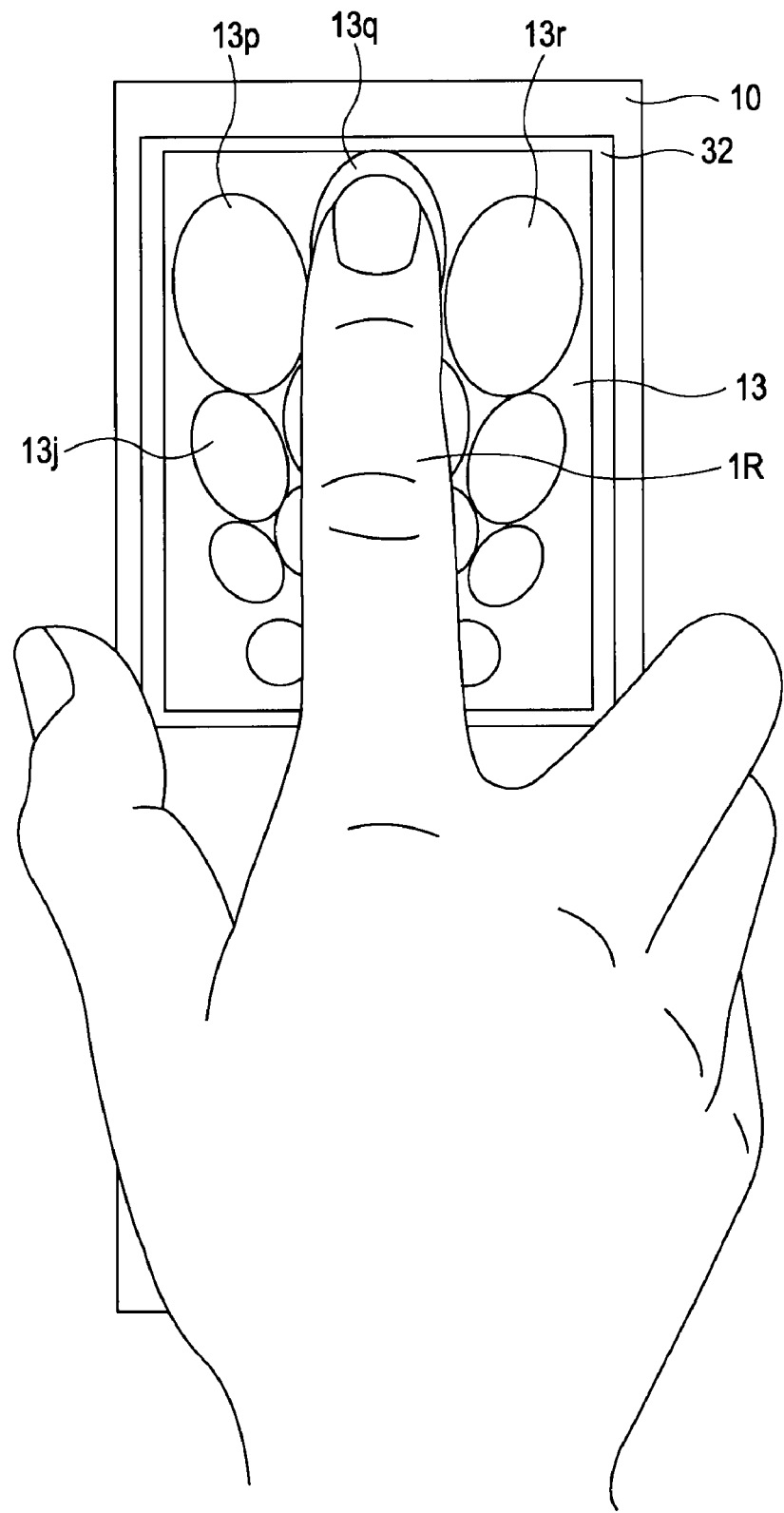
FIG. 8 is a schematic view showing a state in which the operation screen in FIG. 5 is operated.
Figure 9:
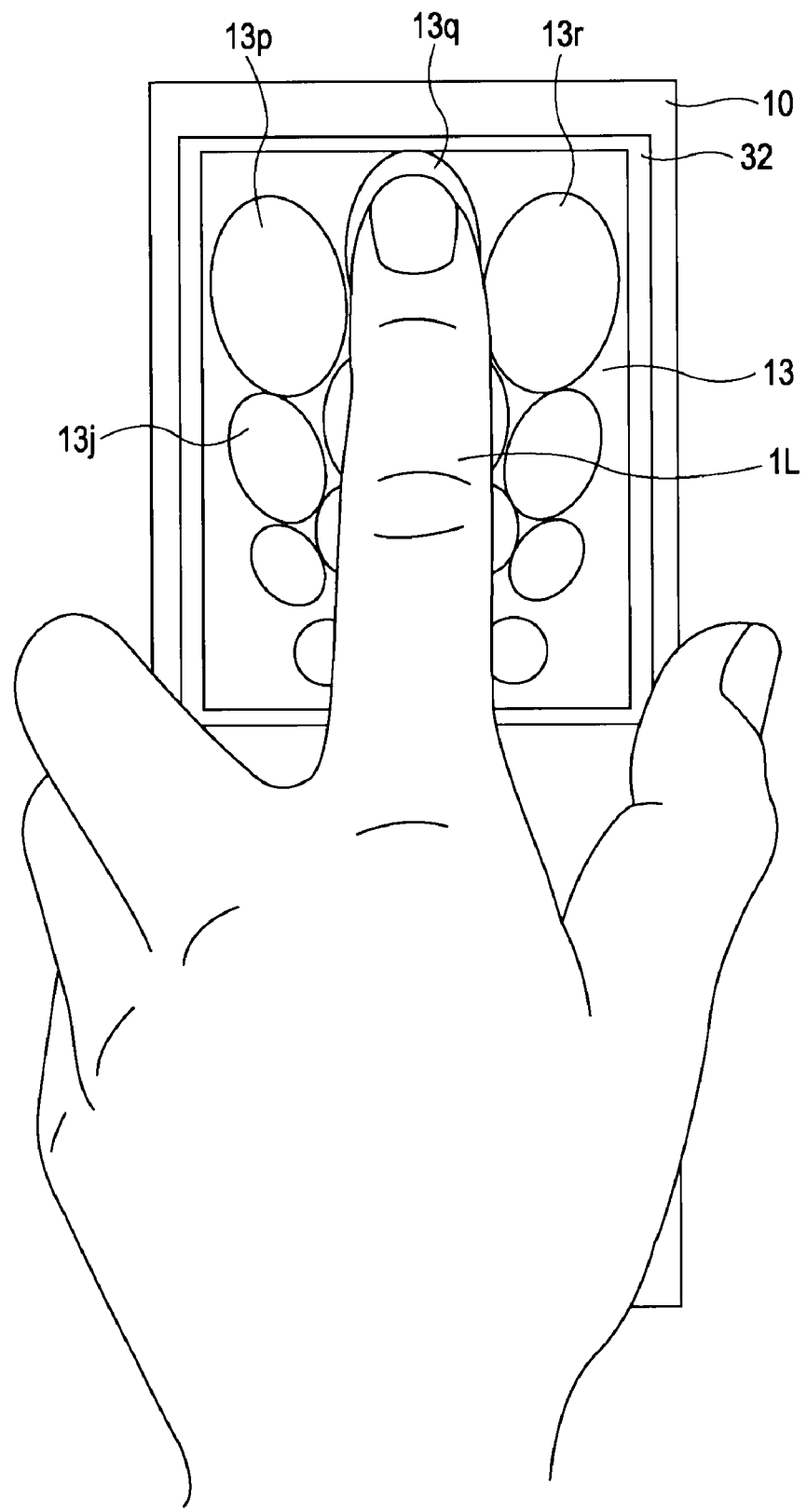
FIG. 9 is a schematic view showing a state in which the operation screen in FIG. 5 is operated.

As shown in FIG. 8, with the operation screen 13 in FIG. 5, a user touches the operation screen 13 (touch panel) with a finger 1R of the right hand while holding the mobile phone terminal 10 with the right hand, or, as shown in FIG. 9, the user touches the operation screen 13 (touch panel) with a finger 1L of the left hand while holding the mobile phone terminal 10 with the left hand.

In each case, as shown in FIGS. 3, 4, and 5, the user pivots the finger 1 from side to side (in the transversal direction of the display panel 32) using the base 1a of the finger 1 as a pivot and stretches and bends the finger 1 back and forth (in the longitudinal direction of the display panel 32) so as to touch a target icon on the operation screen.

FIGS. 10A, 10B, 10C, and 10D show states of a fingertip 1c of a user along a line connecting the base point P1 and the center of the icon 11r when the user touches the operation screen 11 in FIG. 3 in the way shown in FIG. 6.

For convenience of illustration, the icons 11d, 11h, 11m, and 11r on the operation screen 11 are supposed to have a thickness, and the touch panel 35 is shown by a dotted line.

Figure 10A:
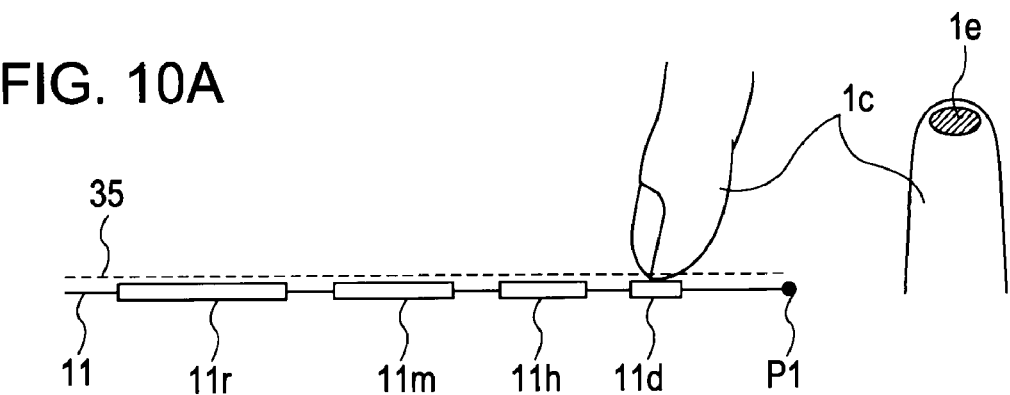
FIGS. 10A to 10D are schematic views showing states of a finger and contact areas when the finger touches an operation screen.

As shown in FIG. 10A, the user bends the finger and raises the fingertip 1c when the user touches the icon 11d that is nearest to the base point P1.

At this time, the area of a part 1e of the fingertip 1c in contact with the touch panel 35, that is, the contact area with the touch panel 35, becomes the smallest, whereby the fingertip 1c can be precisely moved.

Therefore, even if the size of the icon 11d is small, the user can easily and securely touch the icon 11d without touching other icons, and misoperation is prevented.

Figure 10B:
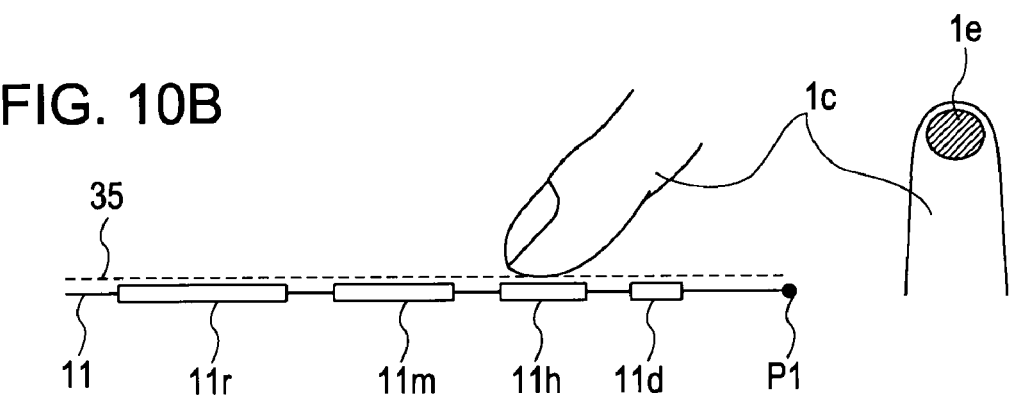
Figure 10C:
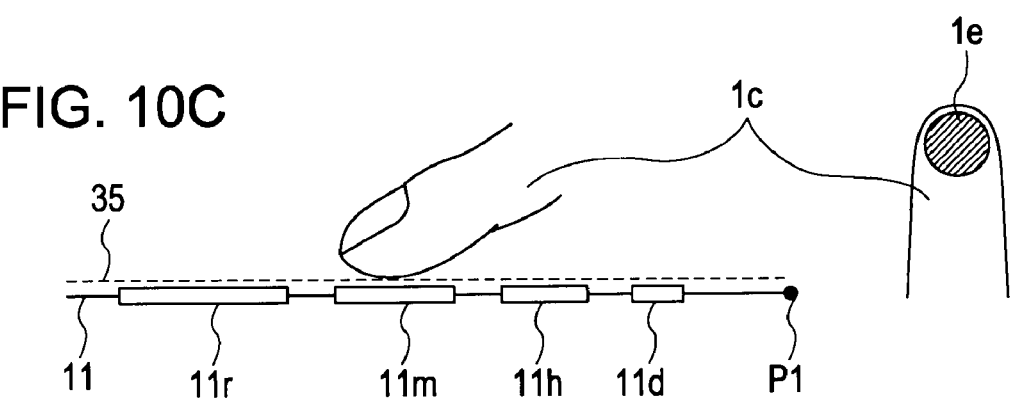
Figure 10D:
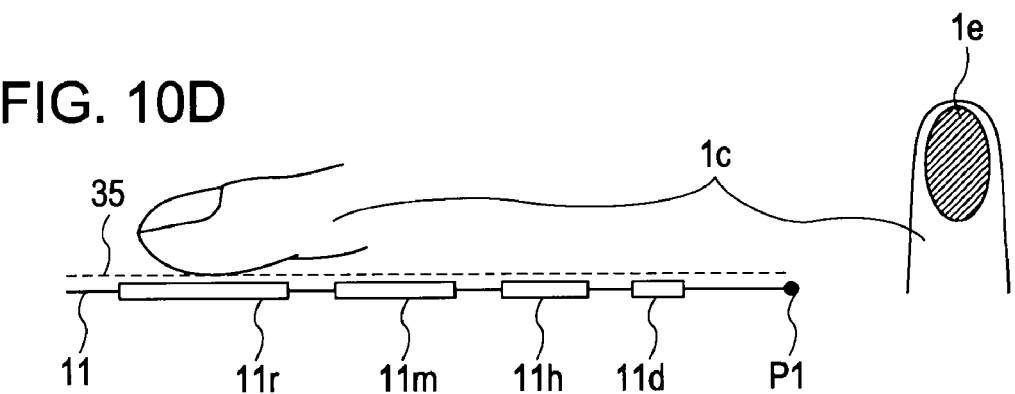

In contrast, as shown in FIG. 10D, the user stretches the finger and lays the fingertip 1c flat when the user touches the icon 11r that is farthest from the base point P1.

At this time, the area of a part 1e of the fingertip 1c in contact with the touch panel 35, that is, the contact area with the touch panel 35, becomes the largest.

As described above, the icon 11r has a large size. Therefore, also in this case, the user can easily and securely touch the icon 11d without touching other icons, and misoperation is prevented.

As shown in FIG. 10B or 10C, when the user touches the icon 11h or 11m, the fingertip 1c is in a state intermediate between the states shown in FIGS. 10A and 10D.

Therefore, when the user touches the icon 11h or 11m, the user can easily and securely touch the icon 11h or 11m without touching other icons, and misoperation is prevented.

The above-described facts hold true for the operation screen 12 in FIG. 4 and the operation screen 13 in FIG. 5.

Moreover, because a large number of icons are arranged like a fan on the operation screens 11, 12, and 13, the user can easily touch an icon among the icons disposed on the same arc by pivoting the finger 1 side by side using the base 1a of the finger 1 as a pivot.

1-4. Selection Setting of Operation Screen

FIG. 11

It is preferable that a user can select a type of operation screen to be displayed among a type arranged for right hand operation such as the operation screen 11, a type arranged for left hand operation such as the operation screen 12, and a type arranged for left or right hand operation such as the operation screen 13.

The mobile phone terminal 10 is set such that a user can cause a type-selection screen to be displayed on the display panel 32 so as to select a type.

The user selects a desired type on the type-selection screen by pressing the select/enter key 22 shown in FIG. 1. The control unit 55 shown in FIG. 2 sets the type of operation screen to be displayed in accordance with the selection.

Figure 11:
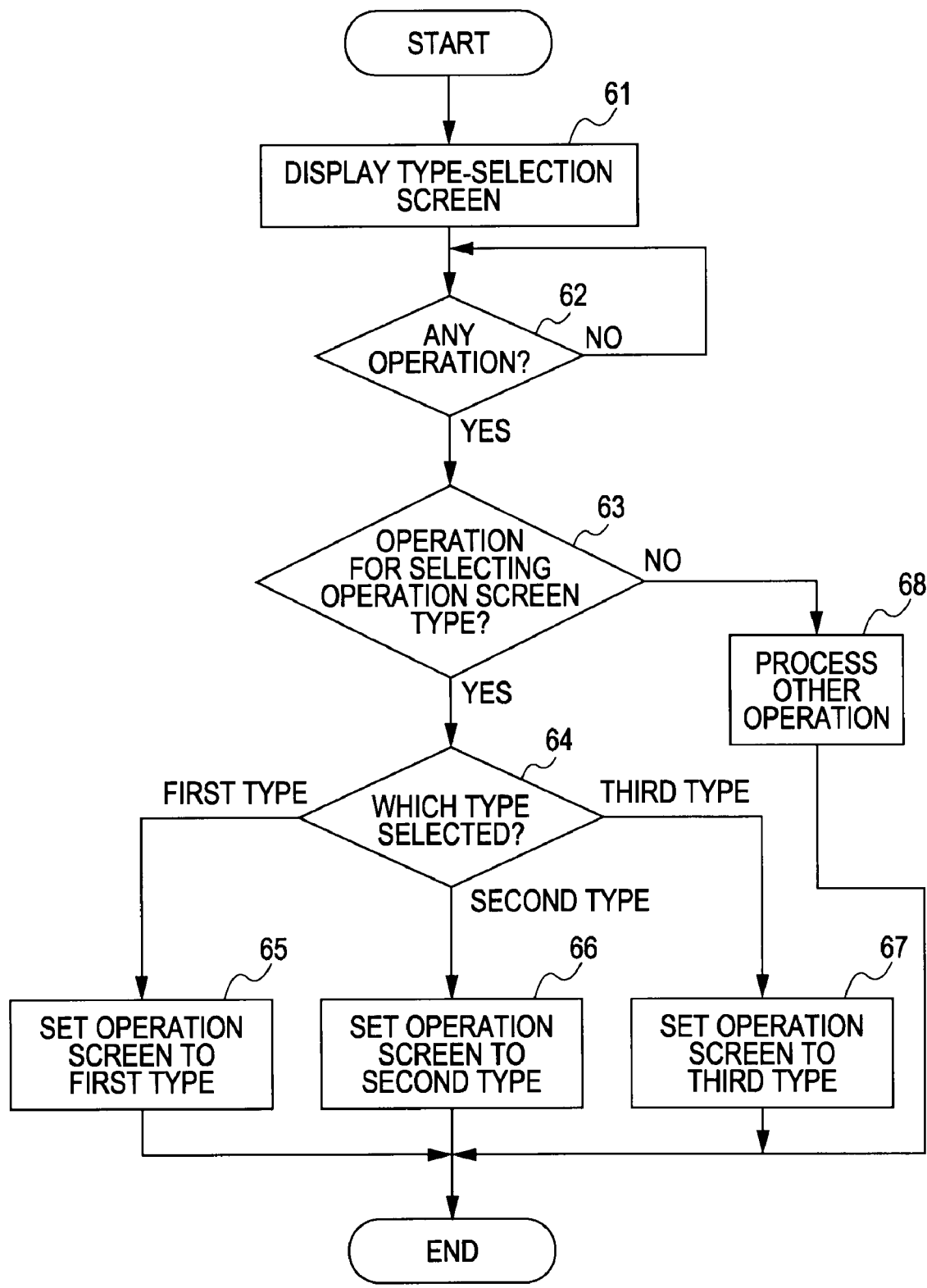
FIG. 11 is a flowchart showing an example of steps performed by a control unit for setting a type of an operation screen.

FIG. 11 shows an example of steps performed by the control unit 55 for selecting a type of operation screen. First, in step 61, the control unit 55 displays the type-selection screen on the display panel 32 of the display unit 31 in accordance with an operation by the user.

Next, in step 62, the control unit 55 determines whether any operation is performed. When an operation is performed, the control unit 55 passes to step 63 and determines whether the operation is an operation for selecting a type of operation screen.

If the operation is an operation for selecting a type of operation screen, the control unit 55 passes from step 63 to step 64 and determines which type is selected among a first type for right hand operation, a second type for left hand operation, and a third type for right or left hand operation.

If the first type is selected, the control unit 55 passes from step 64 to step 65, and sets the type of operation screen to the first type. If the second type is selected, the control unit 55 passes from step 64 to step 66, and sets the type of operation screen to the second type. If the third type is selected, the control unit 55 passes from step 64 to step 67, and sets the type of operation screen to the third type.

If, in step 63, the control unit 55 determines that the operation is not an operation for selecting a type of operation screen, the control unit 55 passes to step 68 and performs processing for the operation.

Instead of the selection among the three types, the device may be configured, for example, to allow a user to select between the first type for right hand operation and the second type for left hand operation.

1-5. Initial Menu Screen

FIG. 12)

Figure 12:
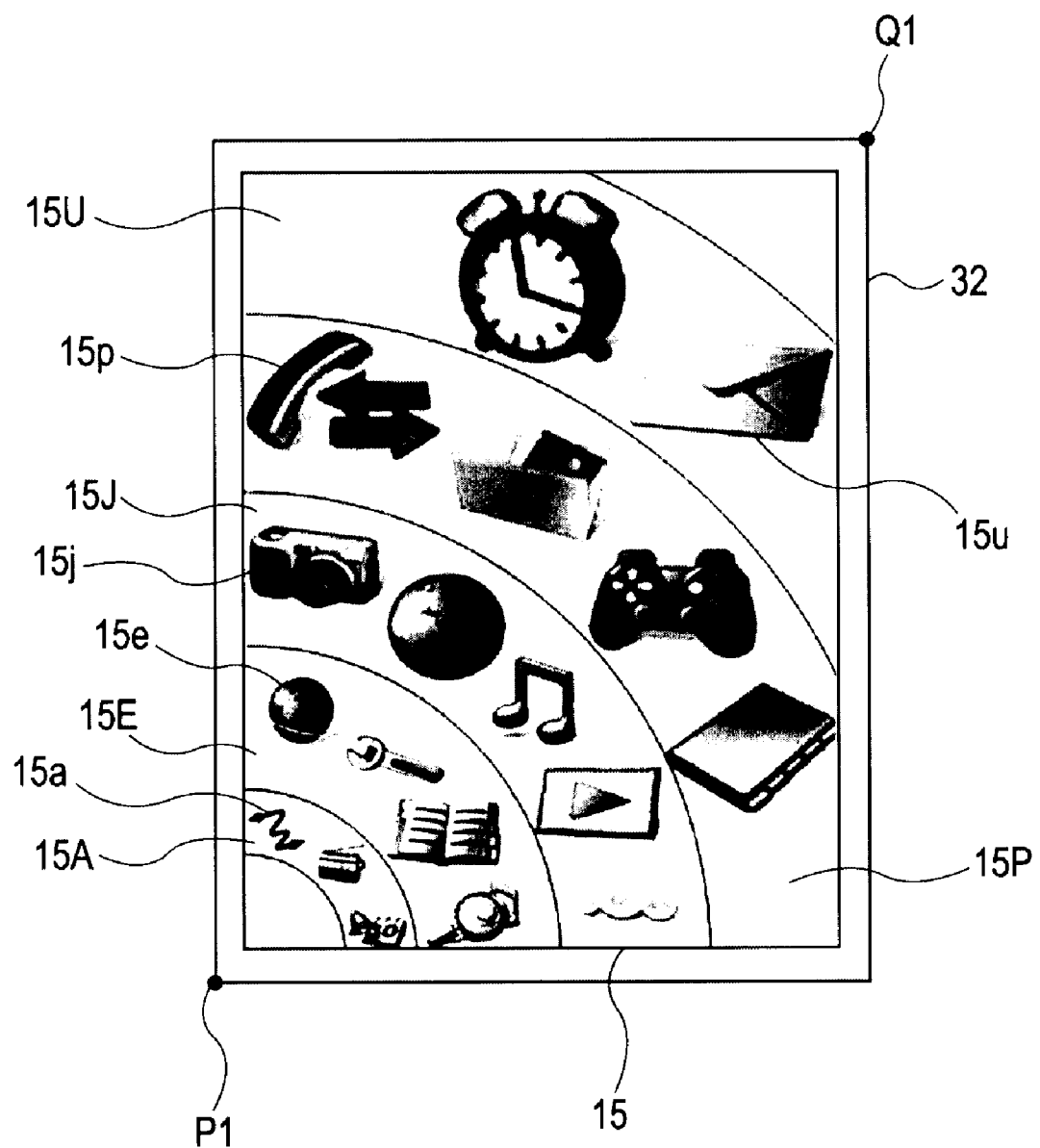
FIG. 12 is a plan view showing an example of an initial menu screen.

As shown in FIG. 12, the mobile phone terminal 10 in FIGS. 1 and 2 displays an initial menu screen 15 on the display panel 32 as an operation screen, when a user presses the center of the select/enter key 22 while an initial screen (standby screen) is being displayed on the display panel 32.

The initial menu screen 15 allows the user to select a desired function among the functions that can be performed with the mobile phone terminal 10.

To be specific, the initial menu screen 15, which is an operation screen for right hand operation, includes a plurality of segments 15A, 15E, 15J, 15P, and 15U disposed in the diagonal direction extending from the base point P1 in the vicinity of the lower-left corner of the display panel 32 to a point Q1 in the vicinity of the upper-right corner.

The widths of the segments 15A, 15E, 15J, 15P, and 15U in the diagonal direction become greater as the segments become farther from the base point P1. However, the width may be the same for two adjacent segments, such as the segments 15E and 15J or the segments 15P and 15U.

An icon 15a and the like are disposed in the segment 15A, an icon 15e and the like are disposed in the segment 15E, an icon 15j and the like are disposed in the segment 15J, an icon 15p and the like are disposed in the segment 15P, and an icon 15u and the like are disposed in the segment 15U.

In this case, the icons disposed in the segment 15A have the smallest size. The icons disposed in the segment 15E have a larger size than the icons disposed in the segment 15A. The icons disposed in the segment 15J have a larger size than the icons disposed in the segment 15E.

The icons disposed in the segment 15P have a larger size than the icons disposed in the segment 15J. The icons disposed in the segment 15U have a larger size than the icons disposed in the segment 15P, the size of the icons disposed in the segment 15U being the largest icon size on the initial menu screen 15.

To be specific, the user selects the icon 15u when creating, sending, and receiving an email, or when reading a received email. The user selects the icon 15j when taking a picture with the main camera or the inner camera.

1-6. Another Example of Mobile Phone Terminal

A mobile phone terminal is not limited to an example shown in FIGS. 1 and 2. For example, the mobile phone terminal is not limited to the foldable type or the type including the main camera and the inner camera.

1-7. Another Example of Display and Operation Device

A display and operation device is not limited to a mobile phone terminal. The display and operation device may be a mobile terminal or a small device such as a PDA (personal digital assistant) or a digital camera, provided that the device has a display unit that includes a touch panel on its display panel and allows an operation screen to be displayed on the display panel.

2. Second Embodiment (Embodiment as Operation Device)

Figure 14:
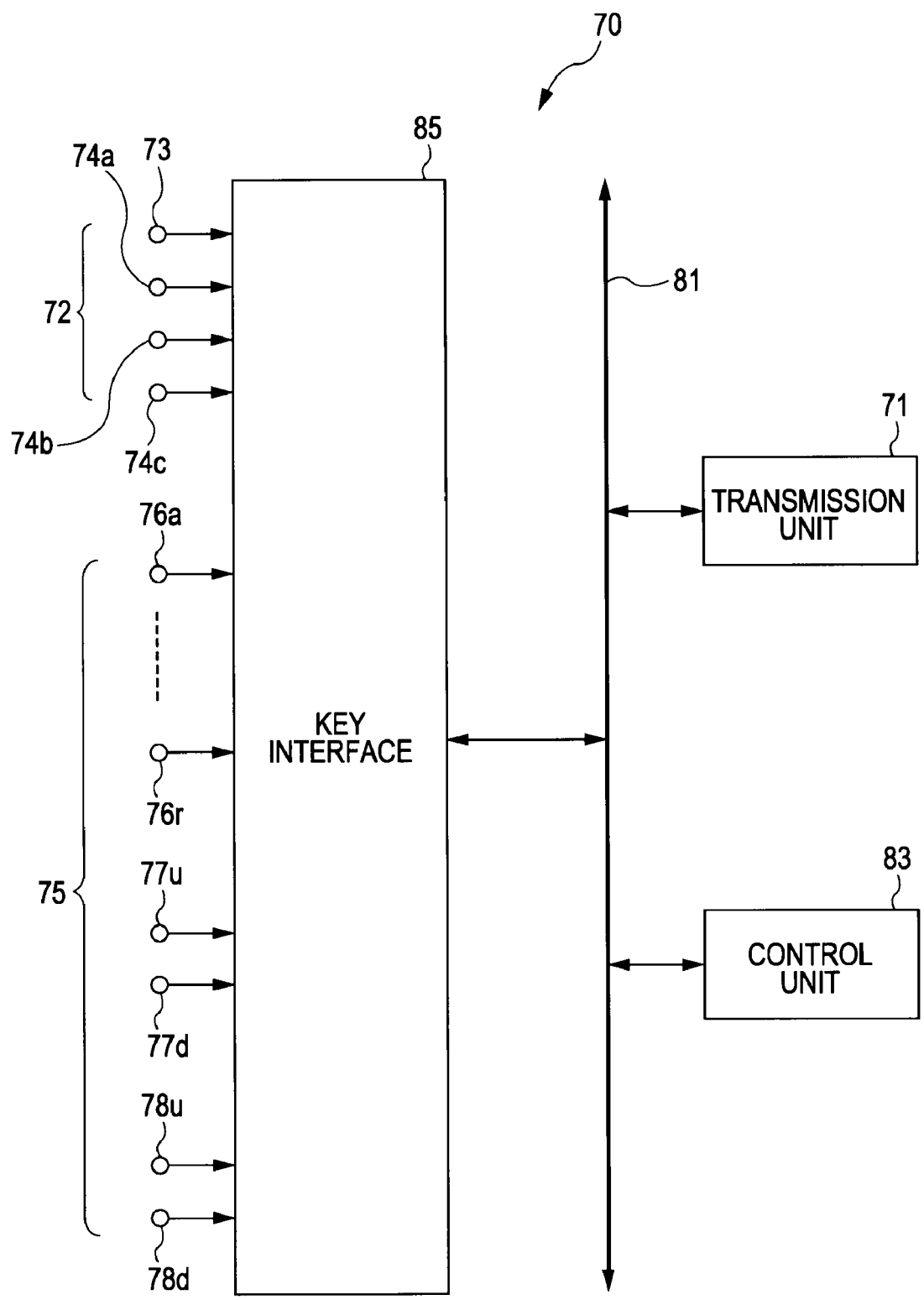
FIG. 14 is a block diagram showing a connection structure of the infrared remote controller in FIG. 13.
Figure 15A:
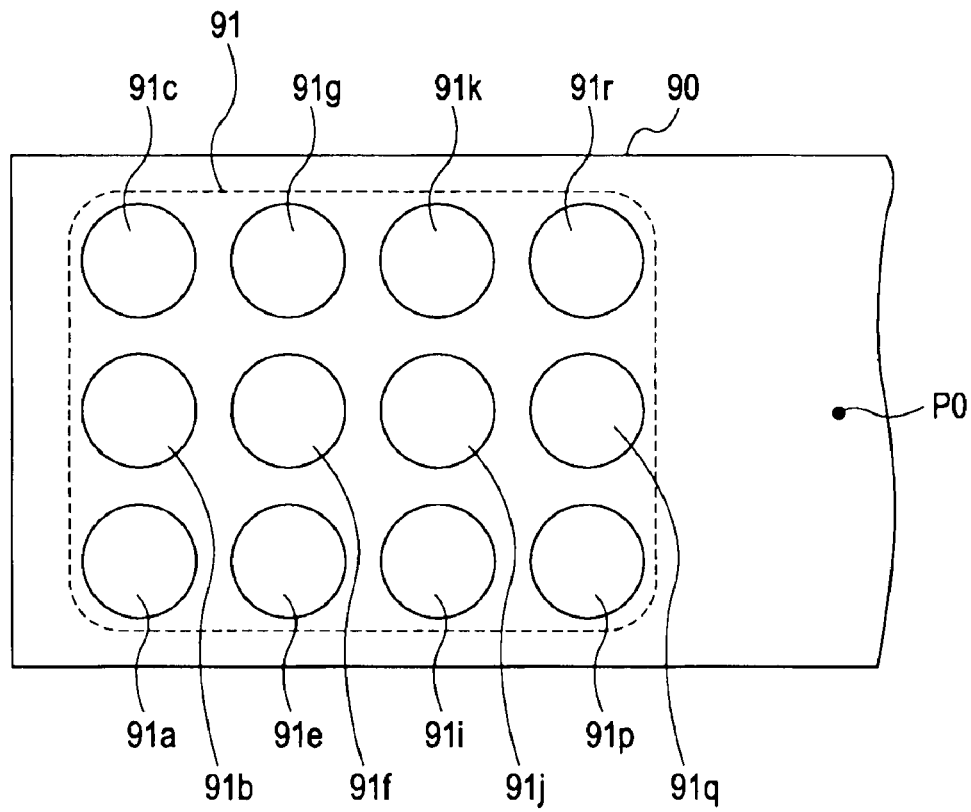
FIGS. 15A and 15B are schematic views for describing existing operation devices.
Figure 15B:
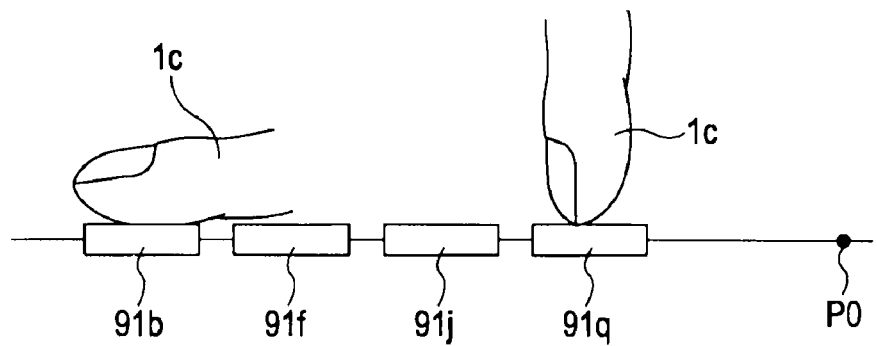

FIGS. 13 and 14

As a second embodiment, an operation device including key operation unit with a plurality of operation keys (buttons) instead of an operation screen displayed on a display screen of a display unit, is described.

2-1. Example as Infrared Remote Controller

FIGS. 13 and 14

FIG. 13 shows an example of an infrared remote controller for a TV set, which is an operation device according to an embodiment of the invention.

An infrared remote controller 70 of the example includes a transmission unit (infrared emitter) 71 on a front end thereof and key operation units 72 and 75 on the back of the transmission unit 71.

The key operation unit 72 includes a power button 73, three operation keys 74a, 74b, and 74c for selecting a function.

The key operation unit 75 includes channel switch keys 76, channel selection keys 77, and volume control keys 78.

The channel switch keys 76 include operation keys 76a, 76b, 76c, 76e, 76f, 76g, 76i, 76j, 76k, 76p, 76q, and 76r on which numbers "1" to "12" are respectively printed.

The channel selection keys 77 include an operation key 77u, on which an upward arrow is printed, for changing the channel up, and an operation key 77d, on which a downward arrow is printed, for changing the channel down.

The volume control keys 78 include an operation key 78u, on which a symbol "+" is printed, for increasing the volume, and an operation key 78d, on which a symbol "−" is printed, for decreasing the volume.

A user operates the key operation unit 75 by holding the infrared remote controller 70 with the right hand or the left hand, positioning a base 1a of a finger (index finger) 1 of the right hand or the left hand on a base point P5 at the back of the key operation unit 75, pivoting the finger 1 side by side using the base 1a of the finger 1 as a pivot, and stretching and bending the finger 1.

Among the channel switch keys 76 in the key operation unit 75, the operation keys 76a, 76b, and 76c that are farthest from the base point P5 have the largest size.

The operation keys 76e, 76f, and 76g have a smaller size than the operation keys 76a, 76b, and 76c. The operation keys 76i, 76j, and 76k have a smaller size than the operation keys 76e, 76f, and 76g.

The operation keys 76p, 76q, and 76r have a smaller size than the operation keys 76i, 76j, and 76k, the size of the operation keys 76p, 76q, and 76r being the smallest key size among the channel switch keys 76.

Among the channel selection keys 77, the operation key 77u for changing the channel up, which is farther from the base point P5, has a larger size than the operation key 77d for changing the channel down, which is nearer to the base point P5.

Among the volume control keys 78, the operation key 78u for increasing the volume, which is farther from the base point P5, has a larger size than the operation key 78d for decreasing the volume, which is nearer to the base point P5.

Thus, in the infrared remote controller 70 of this example, the possibility of misoperation of the key operation unit 75 is considerably decreased for the same reason as described with FIG. 10.

In the infrared remote controller 70 of this example, groups of the operation keys 76a to 76c, 76e to 76g, 76i to 76k, and 76p to 76r may each be disposed on an arc like a fan.

FIG. 14 shows a connection structure of the infrared remote controller 70 in the example shown in FIG. 13. In the infrared remote controller 70, the transmission unit 71, a control unit 83, and a key interface 85 are connected to a bus 81. Operation keys that constitute a key operation unit 72, and operation keys that constitute a key operation unit 75 are connected to a key interface 85.

The control unit 83 is implemented in a microcomputer including a CPU. The control unit 83 detects a key operation on the key operation units 72 and 75, generates a control signal corresponding to the key operation, and causes the transmission unit 71 to transmit the control signal as an infrared remote control signal.

The infrared remote control signal transmitted from the transmission unit 71 is received by a receiving unit (infrared receiving unit), which is not shown in the figure, disposed in a TV set. Thus, channel selection, volume control, and other operations are performed in the TV set.

2-2. Other Examples

The infrared remote controller may have a key operation unit configured differently from the key operation unit shown in FIG. 13.

The remote controller is not limited to a controller using infrared. A controller using light other than infrared or a radio communication type may be used.

The operation device is not limited to a remote controller, provided that the apparatus includes a key operation unit with a plurality of operation keys.

The present application contains subject matter related to that disclosed in Japanese Priority Patent Application JP 2008-112203 filed in the Japan Patent Office on Apr. 23, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display and operation device comprising:
   a display unit;
   a touch panel disposed on a display panel of the display unit; and
   a control unit for displaying a plurality of icons as an operation screen on the display panel of the display unit, the size of each of the plurality of icons being larger for the icons that are farther from a base point positioned in the vicinity of a periphery of the display panel on the device,
   wherein the control unit displays the operation screen upon selection by a user, the selection being made between a first operation screen having a first point adjacent to a lower-left corner of the display unit as the base point and a second operation screen having a second point adjacent to a lower-right corner of the display unit as the base point, said lower-left corner and said lower-right corner being in reference to an orientation of the plurality of icons as displayed on the operation screen.

2. The display and operation device according to claim 1, wherein the control unit displays the operation screen upon selection by a user, the selection being made among a first operation screen having a first point on the device as the base point, a second operation screen having a second point on the device as the base point, and a third operation screen having a third point on the device as the base point, the second point being different from the first point, the third point being positioned between the first point and the second point.

3. The display and operation device according to any claims 1 or 2,
   wherein the device is a mobile terminal including a key operation unit with a plurality of operation keys, the key operation unit being different from the display unit.

4. The display and operation device of claim 1, wherein said control unit displays on the display unit said plurality of icons in a fan shape along an arc.

5. The display and operation device of claim 1, wherein the plurality of icons are disposed symmetrically with respect to each other between the first operation screen and the second operation screen.

6. An operation device comprising:
   a key operation unit disposed in an area of the device, the key operation unit including a display having a plurality of operation keys the size of each of which is larger for the operation keys that are farther from a base point positioned in the vicinity of a lower periphery of an upper surface of the key operation unit,
   wherein said lower periphery being in reference to an orientation of the key operation unit when the plurality of operation keys are displayed in an upright position, said plurality of operation keys being displayed upon selection by a user,
   the plurality of operation keys being displayed upon selection by a user, the selection being made between a first operation screen having a first point adjacent to a lower-left corner of the display as the base point and a second operation screen having a second point adjacent to a lower-right corner of the display as the base point, said lower-left corner and said lower-right corner being in reference to an orientation of the plurality of operation key as displayed on the display.

7. The operation device according to claim 6, further comprising:
   a transmission unit for transmitting a signal as a remote control signal to a target device by optical communication or radio communication, the signal being generated in accordance with an operation performed with the operation keys.

8. The device of claim 6, wherein said key operation unit displays said plurality of keys in a fan shape along an arc.

9. The device of claim 6, wherein the plurality of keys are disposed symmetrically with respect to each other between the first operation screen and the second operation screen.

10. A non-transitory computer readable memory having instructions stored therein that when executed by a control unit including a computer performs a method, the control unit being disposed in a display and operation device including a display unit and a touch panel disposed on a display panel of the display unit, the method comprising:
    displaying a plurality of icons on the display panel of the display unit as an operation screen, the size of each of the plurality of icons being larger for the icons that are farther from a base point positioned in the vicinity of a periphery of the display panel on the device; and
    the control unit displaying the operation screen upon selection by a user, the selection being made between a first operation screen having a first point adjacent to a lower-left corner of the display unit as the base point and a second operation screen having a second point adjacent to a lower-right corner of the display unit as the base point, said lower-left corner and said lower-right corner being in reference to an orientation of the plurality of icons as displayed on the operation screen.

11. The computer readable memory of claim 10, wherein said method includes displaying said plurality of icons in a fan shape along an arc of the display unit.

12. The computer readable medium of claim 10, wherein the method includes displaying the plurality of icons symmetrically with respect to each other between the first operation screen and the second operation screen.

* * * * *